US005476728A

United States Patent [19]

Nakano et al.

[11] Patent Number: 5,476,728

[45] Date of Patent: Dec. 19, 1995

[54] COMPOSITE MULTILAYER PARTS

[75] Inventors: Atsuyuki Nakano; Satoshi Saito; Takeshi Nomura, all of Chiba, Japan

[73] Assignee: TDK Corporation, Tokyo, Japan

[21] Appl. No.: 25,320

[22] Filed: Mar. 2, 1993

[30] Foreign Application Priority Data

| | | | |
|---|---|---|---|
| Mar. 31, 1992 | [JP] | Japan | 4-105485 |
| Mar. 31, 1992 | [JP] | Japan | 4-105487 |
| Jun. 24, 1992 | [JP] | Japan | 4-190113 |

[51] Int. Cl.[6] .......... B32B 9/00

[52] U.S. Cl. .......... 428/692; 252/62.58; 252/62.6; 252/62.62; 501/10; 501/49; 501/32

[58] Field of Search .......... 428/692; 252/62.58, 252/62.6, 62.62; 501/10, 49, 32

[56] References Cited

U.S. PATENT DOCUMENTS 4,956,114 9/1990 Watanabe et al. .......... 252/62.58

FOREIGN PATENT DOCUMENTS 58-184709 10/1983 Japan .

*Primary Examiner*—Paul J. Thibodeau
*Assistant Examiner*—R. Follett
*Attorney, Agent, or Firm*—Oblon, Spivak, McClelland, Maier & Neustadt

[57] ABSTRACT

Non-magnetic ferrite composition used in the composite multilayer part of the invention is based on ferrite containing $Fe_2O_3$ and CuO and/or ZnO and further contains 1 to 30 % by weight of four oxide components of MgO, BaO, $SiO_2$, and $B_2O_3$ or five or six oxide components including the four oxide components plus at least one of $SnO_2$ and CaO. Since the use of this non-magnetic ferrite minimizes the difference in coefficient of linear expansion between different materials used, the non-magnetic ferrite, when applied to composite multilayer parts such as shielded multilayer chip inductors, shielded multilayer transformers, and multilayer LC composite parts, prevents occurrence of cracks in the interior and avoids a lowering of circuit resistance due to precipitation of CuO, ZnO or the like at the interface between different materials. There result composite multilayer parts with improved characteristics.

17 Claims, 12 Drawing Sheets

COMPOSITE MULTILAYER PARTS

Where there is a substantial difference in composition between the magnetic and non-magnetic materials, it can happen that circuit resistance (IR) decreases due to precipitation of CuO, ZnO or the like.

Multilayer LC composite parts having integrally fabricated a capacitor chip including ceramic dielectric layers and internal electrode layers stacked thereon and an inductor chip including magnetic material layers and inner conductor layers stacked thereon, which belong to composite multilayer parts, are widely used in various electronic equipment because of reduced volume, rigidity and reliability.

These LC composite parts are generally fabricated by integrally layering inner conductor-forming paste, magnetic layer-forming paste, dielectric layer-forming paste and internal electrode layer-forming paste by a thick film technique, firing the thus formed multilayer, and printing or transferring external electrode layer-forming paste to the surface of the fired multilayer, followed by firing. Ni—Cu—Zn ferrite and Ni—Zn ferrite are generally used herein as the magnetic material to form the magnetic layer because they can be fired at low temperature. However, we found that the use of Ni—Cu—Zn ferrite and Ni—Zn ferrite as the magnetic material can lead to an extremely lower circuit resistance than expected.

Making investigations on this phenomenon, we have found that firing and external electrode baking cause Cu and Cu oxide, Zn and Zn oxide and the like to precipitate at the joint interface between the ceramic magnetic layer of the inductor chip and the ceramic dielectric layer of the capacitor chip, forming a layer of low electric resistance. As a consequence, the parts experience a substantial lowering of circuit resistance.

One possible solution to this problem is by providing an intermediate layer of, for example, non-magnetic ferrite at the joint interface between a magnetic layer and a dielectric layer for preventing precipitation of Cu, Zn, etc. The intermediate layer which has heretofore been used, however, could not completely prevent local precipitation at the joint interface though it was effective in reducing the amount of precipitate. Therefore, the parts could not be improved in circuit resistance to a satisfactory extent.

The problems of the shielded multilayer chip inductors and multilayer LC composite parts mentioned above arise particularly when there is a substantial difference in coefficient of linear expansion between the materials used. Not only the shielded multilayer chip inductors and multilayer LC composite parts, but also other composite multilayer parts such as shielded multilayer transformers suffer from these problems.

DISCLOSURE OF THE INVENTION

Therefore, an object of the present invention is to solve the aforementioned problems and to provide a composite multilayer part which can avoid such problems as deterioration of characteristics, occurrence of internal cracks resulting from internal stresses induced in the composite multilayer part by a difference in coefficient of linear expansion between distinct materials, and precipitation of Cu oxide, Zn oxide or the like near the interface between distinct materials to form a low circuit resistance layer and which exhibits improved characteristics as well as non-magnetic and magnetic ferrite materials therefor.

This and other objects are attained by the present invention which is defined below as (1) to (28).

(1) A composite multilayer part comprising a magnetic material layer containing magnetic ferrite, a non-magnetic insulator layer, and a conductor layer and having an inductor built therein, said non-magnetic insulator layer being comprised of a non-magnetic ferrite composition containing a non-magnetic ferrite consisting of iron oxide and copper oxide and/or zinc oxide and having further added thereto four oxide components of magnesium oxide, barium oxide, silicon oxide and boron oxide or five or six oxide components including the four oxide components plus at least one oxide component of tin oxide and calcium oxide such that the total of MgO, BaO, $SiO_2$, $B_2O_3$, $SnO_2$, and CaO is in the range of 1 to 30% by weight based on the non-magnetic ferrite said non-magnetic ferrite consisting of 100 mol % of $Fe_2O_3$ and CuO and/or ZnO.

(2) The composite multilayer part of (1) wherein said non-magnetic ferrite consists of 46 to 50 mol % of $Fe_2O_3$, 2 to 20 mol % of CuO, and 33 to 52 mol % of ZnO.

(3) The composite multilayer part of (2) wherein 0.25 to 8% by weight of MgO, 0.4 to 9% by weight of BaO, 0.25 to 7% by weight of $SiO_2$, 0.1 to 3% by weight of $B_2O_3$, 0 to 0.7% by weight of $SnO_2$, and 0 to 8% by weight of CaO are added in the total amount of 1 to 30% by weight.

(4) The composite multilayer part of (1) wherein said magnetic material layer is comprised of a magnetic ferrite containing two or three oxides of NiO, CuO and ZnO.

(5) The composite multilayer part of (1) wherein said magnetic material layer is in contact with said non-magnetic insulator layer.

(6) The composite multilayer part of (5) wherein said magnetic material layer is in contact with said non-magnetic insulator layer at their end faces in a thickness direction.

(7) The composite multilayer part of (6) which comprises an inner magnetic material layered section including a plurality of the magnetic material layers, a non-magnetic insulator layered section including a plurality of the non-magnetic insulator layers and surrounding the inner magnetic material layered section, and an outer magnetic material layered section including a plurality of the magnetic material layers and surrounding the periphery of the non-magnetic insulator layered section, said non-magnetic insulator layered section having the conductor layer buried therein such that the conductor layer may provide vertically overlying turns extending from between the insulator layers to between the insulator layers and around said inner magnetic material layered section.

(8) The composite multilayer part of (5) wherein said non-magnetic ferrite consists of 46 to 50 mol % of $Fe_2O_3$, 2 to 20 mol % of CuO, and 33 to 52 mol % of ZnO, and said non-magnetic ferrite composition has the oxide components: 0.5 to 8% by weight of MgO, 0.8 to 9% by weight of BaO, 0.5 to 7% by weight of $SiO_2$, 0.2 to 3% by weight of $B_2O_3$, 0 to 0.7% by weight of $SnO_2$, and 0 to 8% by weight of CaO, added to said ferrite in a total amount of 2 to 30% by weight.

(9) The composite multilayer part of (5) wherein said magnetic ferrite contains 40 to 52 mol % of $Fe_2O_3$, 0 to 50 mol % of NiO, 0 to 20 mol % of CuO, and 0 to 50 mol % of ZnO.

(10) The composite multilayer part of (9) wherein said magnetic ferrite is a low-temperature fired ferrite consisting of 46 to 49.5 mol % of $Fe_2O_3$, 5 to 15 mol % of NiO, 6 to 18 mol % of CuO, and 20 to 35 mol % of ZnO.

(11) The composite multilayer part of (7) which further includes an intermediate insulator layer formed at the joint interface between said magnetic material layer and said non-magnetic insulator layer, said intermediate insulator layer having a coefficient of linear expansion intermediate the coefficients of linear expansion of the magnetic ferrite and the non-magnetic ferrite.

(12) The composite multilayer part of (11) wherein said intermediate insulator layer contains the magnetic ferrite and the non-magnetic ferrite in a weight ratio of from 1:9 to 9:1.

(13) The composite multilayer part of (7) wherein in said inner magnetic material layered section, the conductor interposed in the space between adjoining magnetic material layers faces each magnetic material layer through a crevice.

(14) The composite multilayer part of (13) wherein said conductor occupies 10 to 85% of the cross sectional area of said space.

(15) The composite multilayer part of (13) wherein in said space, said magnetic material layer and said conductor are in contact over a percent contact area of up to 50% .

(16) The composite multilayer part of (7) wherein said conductor has a void content of up to 50% .

(17) The composite multilayer part of (1) which further comprises a ceramic dielectric layer and has an inductor and a capacitor built therein, said non-magnetic insulator layer being interposed between said magnetic material layer and said ceramic dielectric layer.

(18) The composite multilayer part of (17) which is an integrated assembly of a capacitor chip including said ceramic dielectric layers and internal electrode layers stacked thereon and an inductor chip including said magnetic material layers and inner conductor layers stacked thereon, at least one non-magnetic insulator layer containing the non-magnetic ferrite being interposed between said capacitor chip and said inductor chip as an intermediate layer.

(19) The composite multilayer part of (18) wherein said non-magnetic ferrite consists of 100 mol % total of 46 to 50 mol % of $Fe_2O_3$, 2 to 20 mol % of CuO, and 33 to 52 mol % of ZnO, and said non-magnetic ferrite composition has the oxide components: 0.25 to 4% by weight of MgO, 0.4 to 4.5% by weight of BaO, 0.25 to 3.5% by weight of $SiO_2$, 0.1 to 3% by weight of $B_2O_3$, 0 to 0.7% by weight of $SnO_2$, and 0 to 4% by weight of CaO, added to said ferrite in a total amount of 1 to 15% by weight.

(20) The composite multilayer part of (18) wherein said magnetic material layer contains Ni—Zn ferrite and/or Ni—Cu—Zn ferrite.

(21) The composite multilayer part of (20) wherein said Ni—Zn ferrite contains 10 to 25 mol % of NiO and 15 to 40 mol % of ZnO.

(22) The composite multilayer part of (20) wherein said Ni—Cu—Zn ferrite contains 5 to 25 mol % of NiO, 5 to 15 mol % of CuO, and 20 to 30 mol % of ZnO.

(23) The composite multilayer part of (18) which has at least two non-magnetic insulator layers as the intermediate layer.

(24) The composite multilayer part of (18) wherein said ceramic dielectric layer contains a titanium oxide base dielectric material.

(25) The composite multilayer part of (18) wherein said capacitor chip and said inductor chip are co-fired.

(26) The composite multilayer part of (18) which is heat treated in an atmosphere containing more excessive oxygen than the atmospheric air during and/or after firing.

(27) The composite multilayer part of (26) wherein said atmosphere has an oxygen partial pressure ratio of 30 to 100%.

(28) The composite multilayer part of (18) wherein the surface of the magnetic layer that is disposed most adjacent to the capacitor chip among the magnetic layers and/or the surface of the ceramic dielectric layer that is disposed most adjacent to the inductor chip among the ceramic dielectric layers are provided with asperities before firing.

OPERATION

The non-magnetic ferrite composition used in the invention requires that four oxide components of MgO, BaO, $SiO_2$, and $B_2O_3$ or five or six oxide components including these four oxide components plus at least one of $SnO_2$ and CaO be added in an amount of 1 to 30% by weight to a non-magnetic ferrite consisting in 100 mol % of $Fe_2O_3$ and CuO and/or ZnO. The ferrite of this composition has a coefficient of linear expansion which is close to that of the magnetic material used herein. This prevents deterioration of the characteristics of composite multilayer parts in the form of shielded multilayer chip inductors and multilayer transformers and occurrence of cracks in the composite multilayer part interior.

In the case of multilayer LC composite parts, the provision of an intermediate layer containing the non-magnetic ferrite mitigates the difference in coefficient of linear expansion between distinct materials and an abrupt change at the interface therebetween, thus suppressing local precipitation of Cu, Cu oxide, Zn, Zn oxide, etc. and avoiding any loss of circuit resistance (IR).

Among the composite multilayer parts of the invention, open magnetic circuit type inductors are compact open magnetic circuit type inductors which eliminate a need for a metal casing, allow the inductor constant to be controlled by a choice of the magnetic permeability of the inner magnetic material, and substantially prevent leakage of magnetic flux to the exterior.

According to the present invention, the influence on the magnetic material layers by expansion and shrinkage of the conductor layer can be reduced by forming a crevice between the magnetic material layer and the conductor layer located within the space between the magnetic material layers.

As a consequence, there is obtained an inductor having increased L and Q, a minimized temperature coefficient of L and Q, and significantly improved temperature characteristic.

These improvements are also found in other composite multilayer parts.

The magnetic ferrite used herein in combination with the non-magnetic ferrite to constitute a composite multilayer part which may be embodied as a shielded multilayer chip inductor or multilayer transformer is a low temperature fired ferrite consisting of $Fe_2O_3$, NiO, CuO, and ZnO, the oxides summing to 100 mol %, preferably consisting of 46 to 49.5 mol % of $Fe_2O_3$, 5 to 15 mol % of NiO, 6 to 18 mol % of CuO, and 20 to 35 mol % of ZnO whereby the composite multilayer part has better properties. Particularly when the part is a transformer, power loss can be reduced and efficacy be increased.

ILLUSTRATIVE CONSTRUCTION

Figure 1:
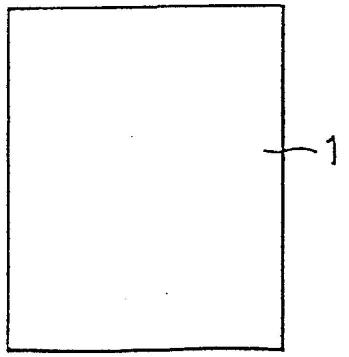
FIG. 1 is a plan view showing one step of successive steps for fabricating one exemplary multilayer inductor of the invention.

Now the illustrative construction of the present invention is described in detail.

The non-magnetic ferrite composition used in the invention is based on a Cu ferrite, Zn ferrite or Cu—Zn ferrite consisting of 100 mol % of $Fe_2O_3$ and CuO and/or ZnO. Four oxide components of magnesium oxide, barium oxide, silicon oxide and boron oxide or five or six oxide components including the four oxide components plus tin oxide and calcium oxide are added to the ferrite such that the total of MgO, BaO, $SiO_2$, and $B_2O_3$ or the total of MgO, BaO, $SiO_2$, $B_2O_3$, and at least one of $SnO_2$and CaO may be in the range of 1 to 30% by weight based on the ferrite.

The advantages of the invention are obtained by adding the above-defined oxide components to the above-defined ferrite. If the amount of the oxide components added is less than 1% by weight, the resulting ferrite has a greater difference in coefficient of linear expansion from the magnetic material and a composite multilayer part fabricated therefrom is susceptible to deterioration and crack occurrence. If the amount of the oxide components added exceeds 30% by weight, a composite multilayer part fabricated therefrom has deteriorated properties.

Especially preferred among the aforementioned ferrite compositions is Cu—Zn ferrite. The ferrite composition is preferably composed of 46 to 50 mol % of $Fe_2O_3$, 0 to 20 mol %, especially 2 to 20 mol % of CuO, and 0 to 52 mol %, especially 33 to 52 mol % of ZnO.

The advantages of the invention are enhanced with this ferrite composition.

Among the additive oxide components, 0.25 to 8% by weight of MgO, 0.4 to 9% by weight of BaO, 0.25 to 7% by weight of $SiO_2$, and 0.1 to 3% by weight of $B_2O_3$ are preferably added in a total amount of 1 to 27 % by weight.

Also, $SnO_2$ and CaO are preferably added in a total amount of 0 to 8% by weight, and among them, $SnO_2$ is preferably added in an amount of 0 to 0.7% by weight, especially 0.03 to 0.7% by weight, and CaO is preferably added in an amount of 0 to 8% by weight, especially 0.5 to 8% by weight.

The total of the four to six oxide components: MgO, BaO, $SiO_2$, and $B_2O_3$ optionally plus $SnO_2$ and CaO is preferably in the range of 1 to 30% by weight.

The four to six oxide components including MgO, BaO, $SiO_2$, and $B_2O_3$ are added as vitrifying components for controlling the coefficient of linear expansion of the ferrite. Using any of these oxide components in excess is not preferred because excess MgO would interfere with sintering of ferrite, and excess BaO would lower the magnetic properties of a composite multilayer part due to barium diffusion. Also, excess $SiO_2$ would result in a lower coefficient of linear expansion and excess $B_2O_3$ would affect the stability with time of ferrite.

Additionally, $SnO_2$ is added mainly for the purpose of preventing the ferrite composition from corrosively attacking part of the equipment used, but its addition may be omitted if unnecessary. CaO is added mainly for the purpose of increasing the coefficient of linear expansion and used as a partial replacement of the vitrifying components. Although it is generally preferred to add CaO, its addition may be omitted if unnecessary. These four to six glass components may remain as glass at the ferrite grain boundary or diffused in ferrite crystal grains.

Among the additive oxide components mentioned above, the preferred amounts of oxide components added to non-magnetic ferrite for use in shielded multilayer chip inductors and multilayer transformers are 0.5 to 8% by weight of MgO, 0.8 to 9% by weight of BaO, 0.5 to 7% by weight of $SiO_2$, and 0.2 to 3% by weight of $B_2O_3$, summing to an amount of 2 to 27 % by weight. Also, $SnO_2$and CaO are preferably added in a total amount of 0 to 8% by weight, and among them, $SnO_2$ is preferably added in an amount of 0 to 0.7% by weight, especially 0.03 to 0.7% by weight, and CaO is preferably added in an amount of 0 to 8% by weight, especially 0.5 to 8% by weight.

And the total amount of the four to six oxide components including MgO, BaO, $SiO_2$, and $B_2O_3$, optionally $SnO_2$ and CaO is preferably 2 to 30% by weight.

The ferrite of this composition is effective when layered with magnetic layers of magnetic ferrite (to be described later) in a thickness direction or when layered with magnetic layers of magnetic ferrite such that their end faces in a thickness direction are disposed contiguous to each other, especially in the latter case.

The advantages of the invention are enhanced by controlling the amount of respective oxide components added within the above-defined range.

The non-magnetic ferrite material is prepared in paste form and fired as will be described later. The fired material exhibits a coefficient of linear expansion of about $105\times10^{-7}$/deg at 800° C. which is within $\pm5\times10^{-7}$/deg from that of the magnetic ferrite.

Hereinafter, the composite multilayer part of the invention is described in further detail by referring to typical examples of a shielded multilayer chip inductor, multilayer transformer and multilayer LC composite part using the non-magnetic ferrite according to the invention.

The material of the magnetic material layer which is used in combination with the above-mentioned non-magnetic ferrite may be any of well-known magnetic layer-forming materials conventionally used in composite multilayer parts such as shielded multilayer chip inductors and multilayer transformers. For example, various spinel soft ferrites having a spinel structure may be used, and for example, ferrites predominantly containing two or three oxides of NiO, CuO and ZnO, typically Ni—Cu—Zn ferrite may be used.

Preferred among others are ferrites having a composition containing 40 to 52 mol %, especially 45 to 50 mol % of $Fe_2O_3$, 0 to 50 mol % of NiO, 0 to 20 mol %, especially 5 to 20 mol % of CuO, and 0 to 50 mol %, especially 0 to 35 mol % of ZnO.

Additionally, Co, Mn, etc. may be contained in an amount of less than about 5% by weight of the entire weight, and Ca, Bi, V, Pb, Al, etc. may be contained in an amount of less than about 1% by weight.

Among these ferrites, Ni system ferrite essentially containing NiO is preferred when the firing temperature is taken into account. Since the Ni system ferrite is a low temperature firing material, an inventive composite multilayer part using a magnetic material layer of such magnetic ferrite can be fired without creating a liquid phase and is further improved in electric resistance. The Ni system ferrites include Ni—Cu ferrite, Ni—Zn ferrite and Ni—Cu—Zn ferrite.

Preferred among the Ni system ferrites used in the practice of the invention are those ferrites which contain $Fe_2O_3$, NiO, CuO, and ZnO and consist of 46 to 49.5 mol %, especially 48.5 to 49.5 mol % of $Fe_2O_3$, 5 to 15 mol %, especially 7 to 13 mol % of NiO, 6 to 18 mol %, especially 10 to 15 mol % of CuO, and 20 to 35 mol %, especially 26 to 32 mol % of ZnO based on the total oxide amount of 100 mol %.

The use of Ni system ferrite of this composition offers much of the advantages of the invention and particularly when used as magnetic material layers in transformers, is effective in reducing the power loss and improving the efficiency of the transformer. In contrast, smaller amounts of $Fe_2O_3$ would lead to short sintering whereas larger amounts of $Fe_2O_3$ would interfere with sintering due to precipitation of a-$Fe_2O_3$, often resulting in deteriorated performance. Smaller or larger amounts of NiO would result in a transformer with an increased power loss and low efficiency. Smaller or larger amounts of CuO would also result in a transformer with an increased power loss and low efficiency. Furthermore, smaller amounts of ZnO would result in a transformer with an increased power loss and low efficiency, and larger amounts of ZnO would give non-magnetic ferrite.

Magnetic material layers of ferrite as mentioned above can be formed by co-firing a ferrite paste and a conductor layer-forming paste at a firing temperature of 600° to 1000° C., especially 800° to 1000° C.

The thickness of the fired magnetic material layer is not critical although it is generally about 240 to 500 μm, and magnetic material layers between conductor layers are about 10 to 100 μm thick.

The material of the conductor layer may be any of conventional well-known conductor layer-forming materials. For example, Ag, Cu, Pd and alloys thereof may be used, with Ag or Ag alloys such as Ag—Pd, especially Ag being preferred. Most preferred is silver or silver alloys containing 70% by weight, especially 90 to 100% by weight of Ag.

The conductor layer is formed by applying and firing a conductor layer-forming paste as will be described later. On firing, voids are often formed within the conductor layer as a result of binder removal or the like.

Preferably, the invention requires that the volume ratio of voids in the conductor layer to the entire conductor layer, that is, the void content of the conductor layer be up to 50%, especially up to 20%. Void contents within this range would lead to a composite multilayer part with improved performance. In the case of a shielded multilayer chip inductor, for example, inductance L and Q are of higher values and their temperature characteristic is further improved. Also a shielded multilayer transformer will have a lower power loss, further increased efficiency, and further improved temperature characteristic.

Ideally, it is preferred that the magnetic layer be completely out of contact with the conductor layer. Since this is difficult to establish in practice, a void content of 1 to 50%, especially 1 to 20% is preferred.

The void content within the conductor layer may be determined by observing a cross section of the chip under a scanning electron microscope (SEM) and calculating the area ratio of voids present in the confine of the conductor layer. By the conductor layer confine is meant the region confined between the boundaries of the conductor layer opposed most closely to the boundaries of the sandwiching magnetic material layers.

The material of the external electrodes is not critical and there may be used any of various conductor materials, for example, Ag, Ni, Cu, etc. or alloys thereof such as Ag—Pd in the form of printed film, plated film, evaporated film, ion plated film, sputtered film or laminate thereof.

The thickness of the external electrode is arbitrary and may be suitably determined for a particular purpose or application although it is generally about 30 to 200 μm.

Now referring to the figures, there is illustrated one embodiment of fabricating an integral inductor by forming an inductor element as a typical example of the composite multilayer part of the invention using non-magnetic ferrite and a layer stacking method according to the present invention and then firing the element. Since the fabrication of an inductor by layer stacking is known from U.S. Pat. No. 4,322,698 and JP-A 51810/1981, the detail of fabrication is omitted herein. The magnetic material layers are formed from a paste of magnetic ferrite powder and the insulator layers are formed from a paste of non-magnetic ferrite as defined herein, for example, by printing. The external terminals are formed by baking a suitable conductor at low temperature.

Figure 15:
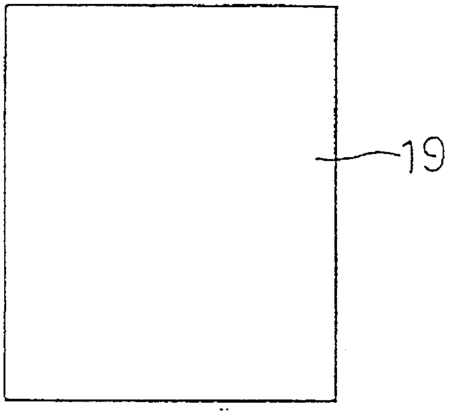
FIG. 15 is a plan view showing one step of successive steps for fabricating the exemplary multilayer inductor of the invention.
Figure 16:
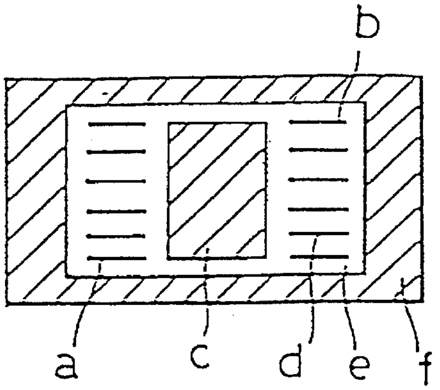
FIG. 16 is a cross-sectional view of a completed multilayer inductor.
Figure 17:
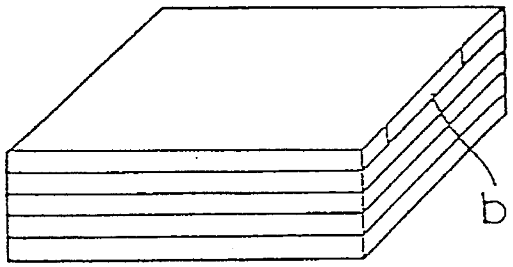
FIG. 17 is a perspective view of the completed multilayer inductor.
Figure 18:
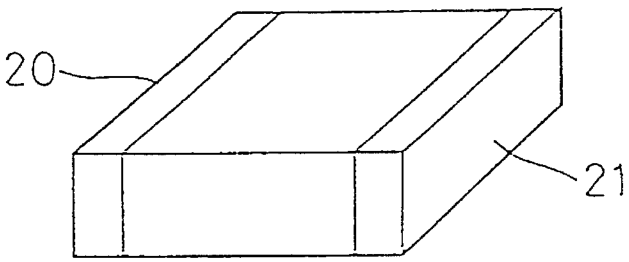
FIG. 18 is a perspective view of a completed shielded inductor.

FIGS. 1 to 15 are plan views at successive steps of the stacking process, FIGS. 16 and 17 are cross sectional and perspective views of the inductor at the end of stacking, and FIG. 18 illustrates the thus completed inductor.

Figure 2:
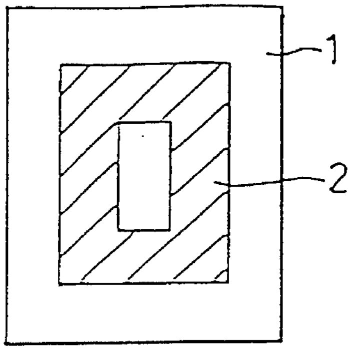
FIG. 2 is a plan view showing one step of successive steps for fabricating the exemplary multilayer inductor of the invention.
Figure 3:
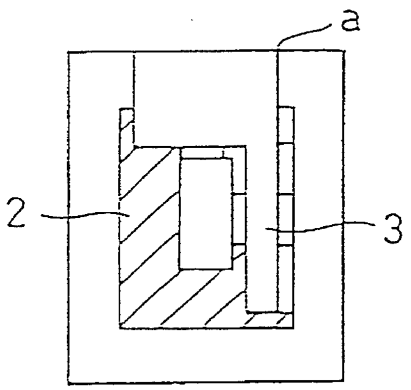
FIG. 3 is a plan view showing one step of successive steps for fabricating the exemplary multilayer inductor of the invention.
Figure 4:
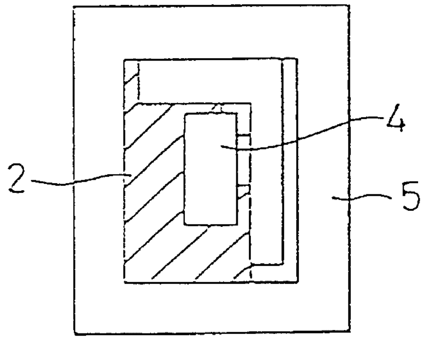
FIG. 4 is a plan view showing one step of successive steps for fabricating the exemplary multilayer inductor of the invention.
Figure 5:
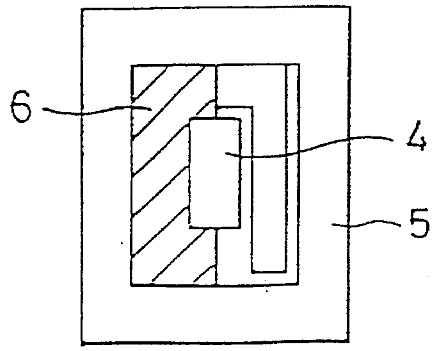
FIG. 5 is a plan view showing one step of successive steps for fabricating the exemplary multilayer inductor of the invention.

A magnetic material layer 1 is provided as shown in FIG. 1, an annular insulator layer 2 is printed on the surface of the layer 1 as shown in FIG. 2, and a conductor layer 3 having a tap a at the external edge is then printed on the insulator layer 2 as shown in FIG. 3. Magnetic material layers 4 and 5 are printed inside and outside the insulator layer 2, that is, on the exposed portions of the magnetic material layer 1 as shown in FIG. 4, and subsequently, an insulator 6 is printed so as to overlie the left half of the insulator 2 as shown in FIG. 5.

Figure 6:
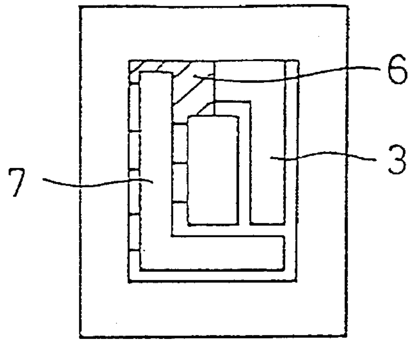
FIG. 6 is a plan view showing one step of successive steps for fabricating the exemplary multilayer inductor of the invention.
Figure 7:
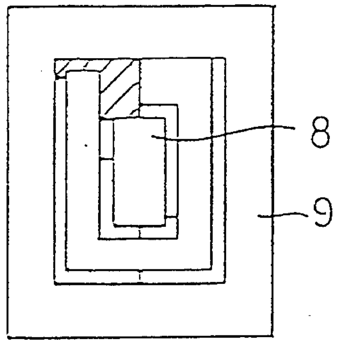
FIG. 7 is a plan view showing one step of successive steps for fabricating the exemplary multilayer inductor of the invention.
Figure 8:
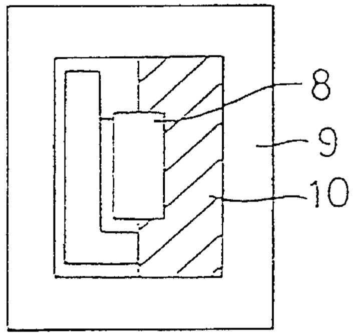
FIG. 8 is a plan view showing one step of successive steps for fabricating the exemplary multilayer inductor of the invention.
Figure 9:
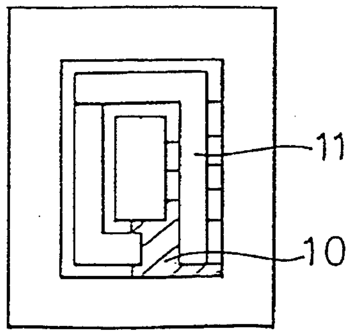
FIG. 9 is a plan view showing one step of successive steps for fabricating the exemplary multilayer inductor of the invention.
Figure 10:
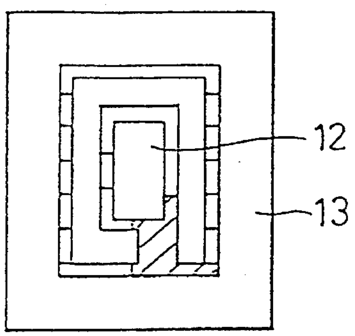
FIG. 10 is a plan view showing one step of successive steps for fabricating the exemplary multilayer inductor of the invention.
Figure 11:
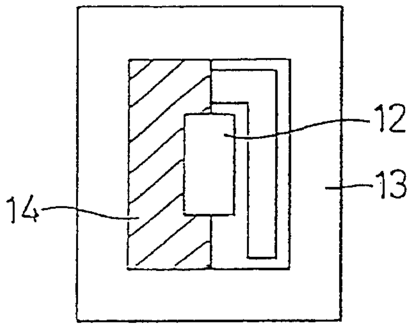
FIG. 11 is a plan view showing one step of successive steps for fabricating the exemplary multilayer inductor of the invention.
Figure 12:
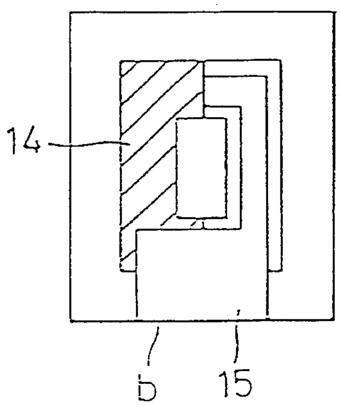
FIG. 12 is a plan view showing one step of successive steps for fabricating the exemplary multilayer inductor of the invention.
Figure 13:
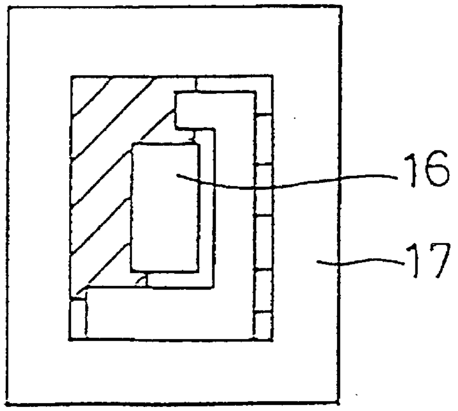
FIG. 13 is a plan view showing one step of successive steps for fabricating the exemplary multilayer inductor of the invention.
Figure 14:
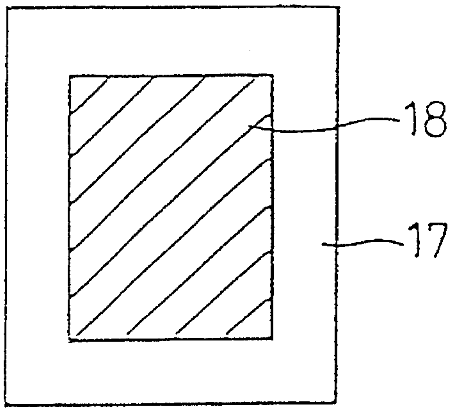
FIG. 14 is a plan view showing one step of successive steps for fabricating the exemplary multilayer inductor of the invention.

Going to the step of FIG. 6, we print a conductor 7 on the insulators 2 and 6 so as to overlie one end of the conductor 3. Inner and outer magnetic material layers 8 and 9 are then printed as shown in FIG. 7. Next, an insulator layer 10 is printed on the right half of the underlying insulator layer as shown in FIG. 8, and a conductor 11 extending from the conductor 7 is printed on the insulator layer as shown in FIG. 9. Inner and outer magnetic material layers 12 and 13 are printed again as shown in FIG. 10, an insulator layer 14 corresponding to the left half is printed again as shown in FIG. 11, a conductor 15 having a tap b is then printed as shown in FIG. 12, and inner and outer magnetic material layers 16 and 17 are then printed as shown in FIG. 13. In the step of FIG. 14, a single insulator layer 18 which is coincident with the outer configuration of the insulator section is printed. A magnetic material layer 19 is finally printed to cover the entire surface of the stack as shown in FIG. 15.

A multilayer stack is obtained in this way. The conductor taps a and b are exposed at the outer surfaces as seen from FIG. 17, the conductor forms a coil d buried in an insulator e as seen from FIG. 16, and the insulator e is surrounded by inner magnetic material c and outer magnetic material f. The multilayer stack is fired at a high temperature of 850° to 890° C. whereby the layers of the respective sections e, c and f are substantially integrally fused and the respective sections are also substantially integrally joined, forming a mechanically tough sintered body as a whole. Finally, external terminals 20 and 21 are baked to the stack as shown in FIG. 18, completing a shielded multilayer inductor according to the present invention.

In the shielded multilayer inductor, it is preferred to form an intermediate insulator layer at the joint interface between the magnetic ferrite material and the non-magnetic ferrite material, the intermediate insulator layer having an intermediate coefficient of linear expansion between the coefficients of linear expansion of both the materials, though not shown in the figures. More preferably, the intermediate insulator layer is comprised of a material containing the magnetic ferrite material and the non-magnetic ferrite material both defined above, preferably in a weight ratio between 1:9 and 9:1, more preferably between 3:7 and 7:3, most preferably 5:5. The intermediate insulator layer preferably has a thickness of 20 to 100 μm.

The intermediate insulator layer may be formed by printing a paste of the material at the joint interface between the magnetic material layer and the insulator layer in the stacking process.

In the practice of the invention, it is preferred that a crevice is formed between the magnetic material layer and the conductor layer in the space between the adjoining magnetic material layers in the inner magnetic material layered section.

In this embodiment, it is unnecessary that the crevice be formed in all the spaces between the adjoining magnetic material layers although it is preferred that the crevice be formed between the magnetic material layer and the conductor layer in all the spaces because much of the advantages of the invention are obtained. Although it suffices that the crevice be formed between at least one magnetic material layer and the conductor layer in the space, much of the advantages of the invention are available when the crevice is formed between each of the magnetic material layers and the conductor layer. The crevice be present either continuously or discontinuously between the magnetic material layer and the conductor layer.

The ratio of the cross-sectional area that the conductor layer occupies in the space is preferably 10 to 85%, especially 50 to 70%. As this ratio increases, the crevice quantity decreases, L and Q lower, and temperature characteristic lowers. As this ratio decreases, the conductor layer fails to provides its function.

The percent contact area of the conductor layer in contact with the magnetic material layer within the space is preferably up to 50%, especially 0 to 20%. As this ratio increases, the crevice quantity decreases, L and Q lower, and temperature characteristic lowers.

It is to be noted that the percent contact area can be 0% if layers are formed under precisely controlled conditions. The cross-sectional area ratio of the conductor layer in the space and the percent contact area of the conductor layer may be determined by observing a cross section under a scanning electron microscope (SEM).

The composite multilayer part of the invention may constitute not only a shielded multilayer chip inductor, but also a shielded multilayer transformer.

Figure 19:
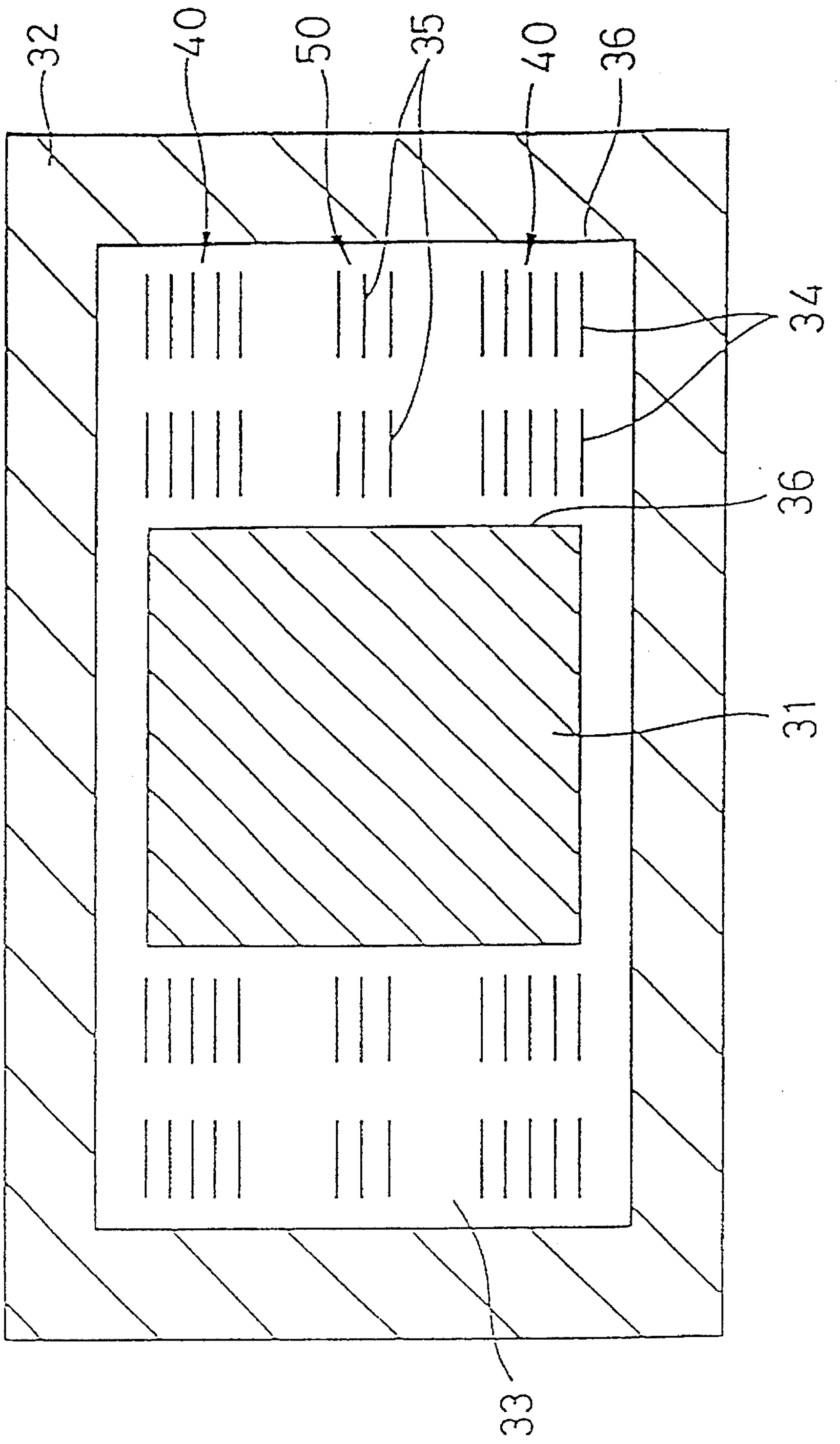
FIG. 19 is a cross-sectional view of a completed multilayer transformer.

One exemplary transformer is shown in the cross-sectional view of FIG. 19.

In FIG. 19, conductors 34 and 35 form primary and secondary coils 40 and 50 buried in an insulator section 33, respectively. The insulator section 33 is in turn surrounded by inner and outer magnetic sections 31 and 32. Intermediate insulator layers 36 are formed at the joint interfaces between the non-magnetic ferrite of the insulator 33 and the magnetic ferrite of the inner magnetic section 31 and between the non-magnetic ferrite of the insulator section 33 and the magnetic ferrite of the outer magnetic section 32.

This transformer can be fabricated by a similar process to the aforementioned inductor fabricating process. It is to be noted that since the transformer, unlike the inductor, includes primary and secondary coils as shown in FIG. 19, printing of the conductor layer should be modified in accordance with the coils. It will be understood that taps of the conductors are omitted in FIG. 19.

Like the aforementioned inductor, this transformer can be obtained as a mechanically tough sintered stack.

With respect to the preferred presence of a crevice between the magnetic material layer and the conductor layer in the space between inner magnetic material layers and the percent contact area between the conductor layer and the magnetic material layer within the space, the same as for the inductor applies. The presence of a crevice contributes fabrication of a transformer having improved properties including power loss and efficacy as well as temperature characteristic.

Figure 21:
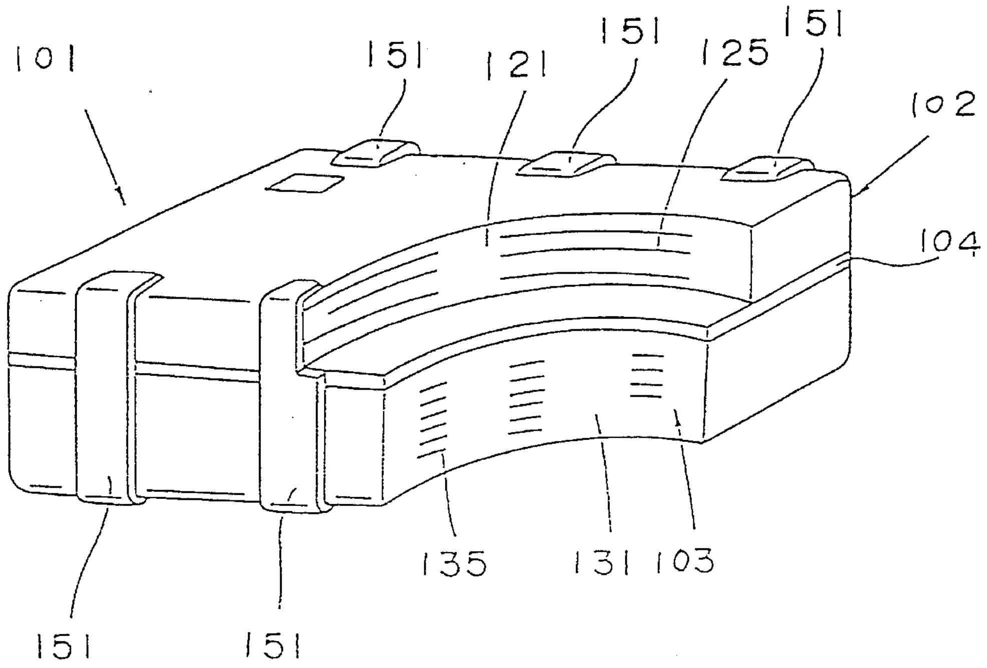
FIG. 21 is a perspective, partially cut-away, view of a multilayer LC composite part which is a preferred embodiment of the composite multilayer part of the invention.

Next, a multilayer LC composite part is shown in FIG. 21 as one preferred embodiment of the invention using non-magnetic ferrite as an intermediate layer and will be described in detail.

The multilayer LC composite part 101 shown in FIG. 21 is an integral assembly of a capacitor chip section 102 including alternately stacked dielectric layers 121 and internal electrode layers 125 and an inductor chip section 103 including alternately stacked magnetic layers 131 and inner conductor layers 135, which are integrated through an intermediate layer 104, the assembly having external electrodes 151 on the surface.

The intermediate layer 104 is preferably the previously mentioned combination of non-magnetic ferrite components. In general, the capacitor chip section 102 of the multilayer LC composite part tends to have a low coefficient of linear expansion as compared with the inductor chip section 103. Therefore, as compared with the aforementioned shielded multilayer chip inductor or shielded multilayer transformer, some changes are made, especially in the preferred range of the amount of oxide components added. More particularly, where a non-magnetic insulative layer is interposed between the magnetic layer and the ceramic dielectric layer (in a thickness direction and optionally in a horizontal direction), the total amount of the four oxide components of MgO, BaO, $SiO_2$, and $B_2O_3$ or four to six oxide components including these four plus $SnO_2$ and/or CaO should preferably be 1 to 15% by weight. Among these components, MgO is preferably 0.25 to 4% by weight, BaO is preferably 0.4 to 4.5% by weight, $SiO_2$ is preferably 0.25 to 3.5% by weight, and $B_2O_3$ is preferably 0.1 to 3% by weight. Also, the total amount of $SnO_2$ and CaO is preferably 0 to 4% by weight, $SnO_2$ is preferably 0 to 0.7% by weight, especially 0.03 to 0.7% by weight, and CaO is preferably 0 to 4% by weight, especially 0.5 to 2% by weight.

This composition ensures better results when formed as the intermediate layer between the magnetic layer of magnetic ferrite of the inductor chip section and the dielectric layer of the capacitor chip section.

Much of the advantages of the invention are obtained by controlling the amounts of the respective oxide components to the above-defined ranges.

The non-magnetic ferrite material is prepared in paste form and fired as will be described later. The fired material exhibits a coefficient of linear expansion of about $105\times10^{-7}$/deg at 800° C. which is within $\pm5\times10^{-7}$/deg from that of the magnetic ferrite.

The intermediate layer 104 is a single layer in the illustrated embodiment although a multiple lamina structure of two or more laminae is preferred. The thickness of the intermediate layer 104 is not critical and may be suitably selected in accordance with a particular application although it is generally about 5 to 150 μm, preferably about 20 to 100 μm. The number of laminae in the intermediate layer 104 is not critical and it may be of a single lamina structure, but preferably of a multiple lamina structure. In the multiple lamina structure, the number of laminae is not critical and may be suitably selected in accordance with a particular application although the number of laminae is generally 1 to 5 in view of efficient manufacture or the like. The total thickness of the intermediate layer may be the same as previously described and the respective laminae may have identical or different thicknesses.

The multilayer LC composite part 101 of the invention has a somewhat abrupt change in composition at each of the interfaces between the magnetic layers 131, intermediate layers 104 and dielectric layers 121 before sintering so that the respective layers can be distinctly discriminated. Firing or baking of external electrodes 151 causes interdiffusion so that the layers have substantially continuous or moderately sloping profile after firing.

The material of which the magnetic layers 131 of the inductor chip section 103 are made is preferably Ni—Cu—Zn ferrite and/or Ni—Zn ferrite, especially Ni—Cu—Zn ferrite.

The inductor chip section of the multilayer LC composite part is often used in a high frequency band of, for example, about 2 to 4 MHz as compared with the shielded multilayer transformer mentioned above. Therefore, some changes will be made in the content of magnetic layer components as the case may be. The Ni—Zn ferrite used in the multilayer LC composite part according to the invention is not critical and may be chosen from a variety of compositions in accordance with a particular purpose, and for example, a NiO content of 10 to 25 mol % and a ZnO content of 15 to 40 mol % are preferred.

The Ni—Cu—Zn ferrite used in the multilayer LC composite part according to the invention is not critical and may be chosen from a variety of compositions in accordance with a particular purpose, and for example, a NiO content of 15 to 25 mol %, a CuO content of 5 to 15 mol % and a ZnO content of 20 to 30 mol % are preferred.

Also Co, Mn and similar elements may be additionally contained in an amount of up to about 5% by weight of the entire ferrite. Further, Ca, Si, Bi, V, Pb and similar elements may be additionally contained in an amount of up to about 1% by weight. Where Ni—Zn ferrite is used, any glass such as borosilicate glass is generally contained additionally.

The conductor of which the inner conductor 135 is made according to the invention is not critical and may be selected from Ag, Pt, Pd, Au, Cu, Ni and alloys containing one or more of them such as Ag—Pd alloy. Use of Ag, Cu and alloys containing one or both of them is preferred since a lower resistivity is required in order to provide practically acceptable Q for the inductor.

The inductor chip section 103 of the multilayer LC composite part 101 may have a conventional well-known structure, with the outer configuration being typically a generally rectangular body shape. As shown in FIG. 21, the inner conductor 135 is typically disposed in spiral arrangement in the magnetic layers 131 to form an internal winding and terminates at opposite ends which are connected to the external electrodes 151 and 151. In this embodiment, the winding pattern of inner conductor 135 or closed magnetic circuit configuration may have any desired pattern and the number of winding turns may be suitably chosen in accordance with a particular application. The size of portions of the inductor chip section 103 is not limited and may be suitably chosen in accordance with a particular application. Often, the inner conductor 135 has a thickness of about 5 to 30 μm, the winding pitch is about 40 to 100 μm, and the number of winding turns is about 1.5 to 50.5 turns. The base magnetic layer 131 has a thickness of about 250 to 500 μm and the magnetic layer between the inner conductors 135 and 135 has a thickness of about 10 to 100 μm.

The dielectric layer 121 of the capacitor chip section 102 is not critical and may be formed of any dielectric material, with titanium oxide base dielectric materials being preferred because of low firing temperature. Otherwise, titanate base composite oxides, zirconate base composite oxides and mixtures thereof may also be used. Glass such as borosilicate glass may be additionally contained in order to provide for lower firing temperatures.

More particularly, the titanium oxide base dielectric materials include $TiO_2$ optionally containing NiO, CuO, $Mn_3O_4$, $Al_2O_3$ , MgO and $SiO_2$, especially CuO, the titanate base composite oxides include $BaTiO_3$, $SrTiO_3$, $CaTiO_3$, $MgTiO_3$ and mixtures thereof, and the zirconate base composite oxides include $BaZrO_3$, $SrZrO_3$, $CaZrO_3$, $MgZrO_3$ and mixtures thereof.

The conductor of which the inner conductor layers 125 are made according to the invention is not critical and may be selected from Ag, Pt, Pd, Au, Cu, Ni and alloys containing one or more of them such as Ag—Pd alloy, with silver and silver alloys such as Ag—Pd alloy being preferred.

The capacitor chip section 102 of the multilayer LC composite part 101 may have a conventional well-known structure, with the outer configuration being typically a generally rectangular body shape. As shown in FIG. 21, the internal electrode layers 125 at one end are connected to the external electrodes 151. The size of portions of the capacitor chip section 102 is not critical and may be suitably chosen in accordance with a particular application. The number of dielectric layers 121 may be chosen in accordance with a particular purpose although it is generally about 1 to 100. The dielectric layers 121 each are generally about 20 to 150 μm thick and the internal electrode layers 125 each are generally about 5 to 30 μm thick.

The conductor of which the external electrodes 151 of the multilayer LC composite part 101 according to the invention are made is not critical and may be selected from Ag, Pt, Pd, Au, Cu, Ni and alloys containing one or more of them such as Ag—Pd alloy, with silver and silver alloys such as Ag—Pd alloy being preferred. The shape and size of the external electrodes 151 are not critical and may be determined in accordance with a particular purpose or application although they generally have a thickness of about 100 to 2,500 μm.

The size of the multilayer LC composite part 101 according to the invention is not critical and may be determined in accordance with a particular purpose or application although it is generally 2.0 to 10.0 mm×1.2 to 15.0 mm×1.2 to 5.0 mm.

Figure 22:
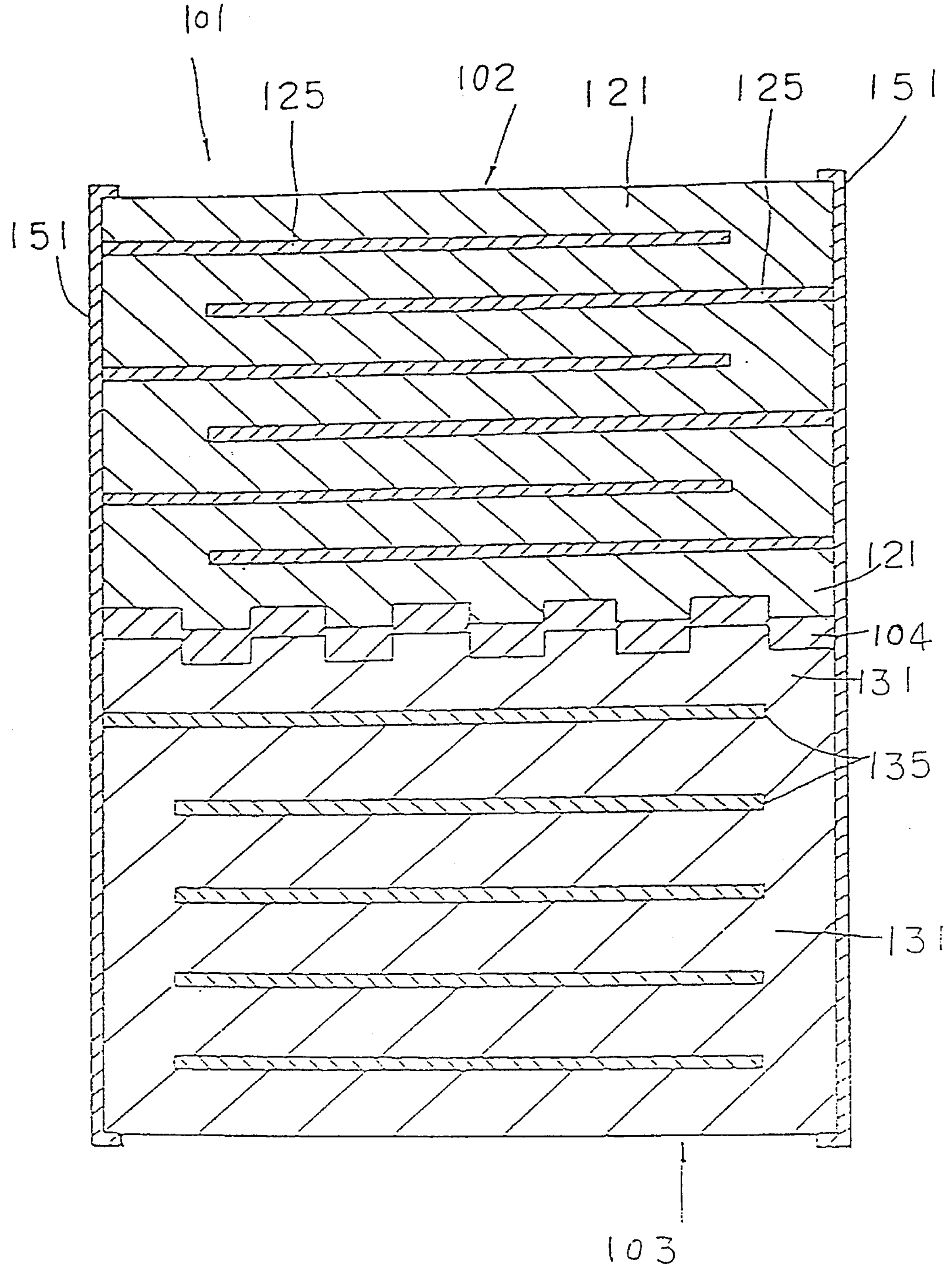
FIG. 22 is a cross-sectional view of a multilayer LC composite part which is a preferred embodiment of the composite multilayer part of the invention.

Next, FIGS. 21 and 22 show a multilayer LC composite part which is one preferred embodiment of the composite multilayer part according to the invention.

The multilayer LC composite part 101 shown in FIGS. 21 and 22 is an integral assembly of a capacitor chip section 102 including alternately stacked dielectric layers 121 and internal electrode layers 125 and an inductor chip section 103 including alternately stacked magnetic layers 131 and inner conductor layers 135, which are integrated through an intermediate layer 104, the assembly having external electrodes 151 on the surface.

Provision of at least one intermediate layer 104 according to the present invention is effective for mitigating the difference in coefficient of linear expansion between the magnetic layers 131 and the dielectric layers and an abrupt change in composition at the interface and reducing precipitation of Cu, Cu oxide, Zn and Zn oxide at the interface, resulting in a part having improved circuit resistance. Where the intermediate layer 104 is provided, the interface between dielectric layer 121 and intermediate layer 104 and/or the interface between magnetic layer 131 and intermediate layer 104 is preferably provided with asperities. Since Cu, Zn and the like precipitate mainly at the interface between dielectric layer 121 and intermediate layer 104, preferably the interface between dielectric layer 121 and intermediate layer 104, more preferably both the interface between dielectric layer 121 and intermediate layer 104 and the interface between magnetic layer 131 and intermediate layer 104 are provided with asperities as shown in FIG. 22. It will be seen that such asperities are omitted in FIG. 21.

The composite multilayer part of the invention is not limited to the aforementioned multilayer LC composite parts, but applicable to various other composite multilayer parts insofar as they partially have the aforementioned structure.

The composite multilayer parts of the invention, typically multilayer LC composite part 101 may be fabricated by conventional printing and sheeting methods using paste.

The magnetic layer-forming paste used in the invention is prepared as follows. First, ferrite source powders, for example, powders of NiO, ZnO, CuO and $Fe_2O_3$ in predetermined amounts are wet milled in a ball mill or the like. The source powders used herein have a particle size of about 0.1 to 10 μm. The wet milled mixture is dried typically by spray dryer and then calcined. Usually the product is then wet milled in a ball mill until a particle size of about 0.01 to 0.5 μm is reached and then dried by a spray dryer.

The resulting ferrite powder is kneaded with a binder such as ethyl cellulose and a solvent such as terpineol and butyl carbitol, obtaining a paste. The magnetic layer-forming paste may contain various glass species and oxides if desired.

The dielectric layer-forming paste used in the multilayer LC composite part 101 according to the invention is not critical and may be prepared by selecting any of dielectric materials or raw powders which convert into dielectric material upon firing in accordance with the aforementioned composition of the dielectric layer, and kneading the dielectric material with any desired binder and solvent. The raw powders may be generally oxides forming titanium oxide or titanate base composite oxides, and any of oxides of Ti, Ba, Sr, Ca, Zr and the like may be used in accordance with the composition of the corresponding oxide dielectric. Also useful are compounds which convert into oxide upon firing, for example, carbonates, sulfates, nitrates, oxalates, and organometallic compounds. These raw powders generally have a mean particle size of about 0.1 to 5 μm. If desired, various glass species may be contained.

Paste of non-magnetic ferrite for forming the intermediate layer used in the composite part according to the invention may be prepared by first preparing ferrite powder as is the magnetic layer-forming paste mentioned above, selecting any dielectric material or raw powders which convert to a dielectric material upon firing in accordance with a desired composition as is the dielectric layer-forming paste mentioned above, and milling them with any desired binder and solvent. As previously mentioned, a ferrite powder of substantially the same, especially the same composition as the ferrite powder used in the magnetic layer-forming paste and raw powder which upon firing converts into substantially the same, especially the same composition as the one resulting from firing of the raw powder used in the dielectric layer-forming paste are used and adjusted to a desired mix ratio.

The raw powder for ferrite, raw powder for dielectric material used, and other parameters such as ferrite powder particle size may be the same as described above. If desired, various glass species and oxides may be contained as sintering aids. Where a mix material is not used, for example, where non-magnetic Zn ferrite is used, paste can be prepared by the same procedure as above.

The inner conductor-forming paste, internal electrode layer-forming paste, and external electrode-forming paste used in fabricating the composite part of the invention are prepared by kneading any of the above-mentioned conductive metals, alloys or various oxides, organometallic compounds or resinates which convert to a conductor upon firing, with any desired binder and solvent.

The contents of the binder and solvent in the respective pastes mentioned above are not critical and may be conventional contents, for example, about 1 to 5% by weight of binder and about 10 to 50% by weight of solvent. The respective pastes may contain therein any additive selected from various dispersants, plasticizers, dielectrics, and insulators, if desired. The total amount of these additives is preferably not more than 10% by weight.

In fabricating the multilayer LC composite part 101, for example, a magnetic layer-forming paste and an inner conductor-forming paste are alternately printed on a support of PET or the like to build up layers. The last printed magnetic layer is provided with asperities on the surface. The shape, pattern, size and other parameters of asperities are not critical and may be properly selected in accordance with a particular application.

Figure 23:
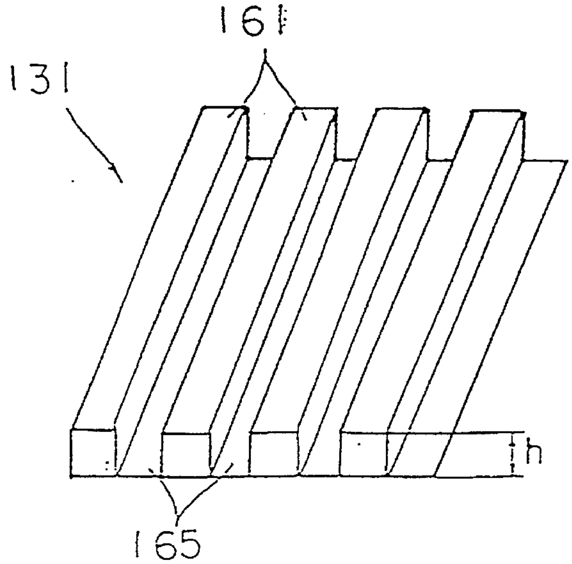
FIG. 23 is a fragmental perspective view showing one exemplary magnetic layer in the composite multilayer part of the invention.
Figure 24:
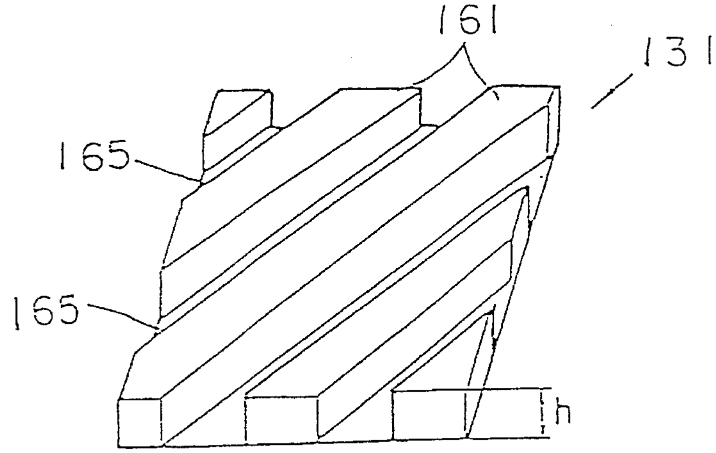
FIG. 24 is a fragmental perspective view showing one exemplary magnetic layer in the composite multilayer part of the invention.

Exemplary shapes or patterns of asperities are shown in FIGS. 23 and 24 as linear protrusions 161 on a plane or differently stated, linear recesses 165 in a plane. In addition to the straight stripe patterns in the illustrated embodiments, the pattern of such recesses 165 or protrusions 161 may take any of wave, curve, zigzag, ring, closed curve and closed zigzag forms.

Figure 25:
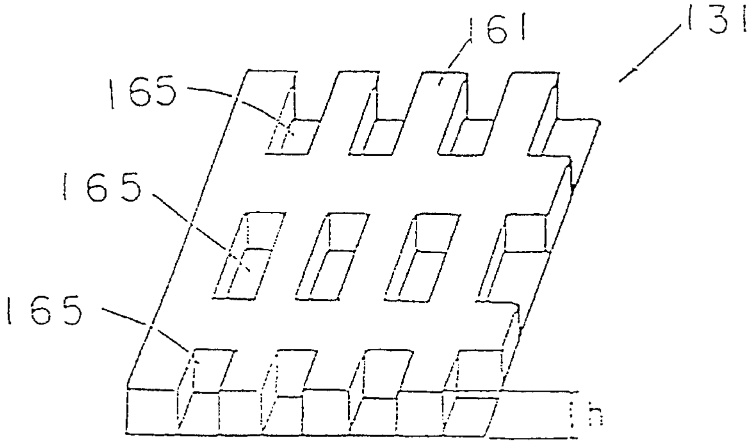
FIG. 25 is a fragmental perspective view showing one exemplary magnetic layer in the composite multilayer part of the invention.
Figure 26:
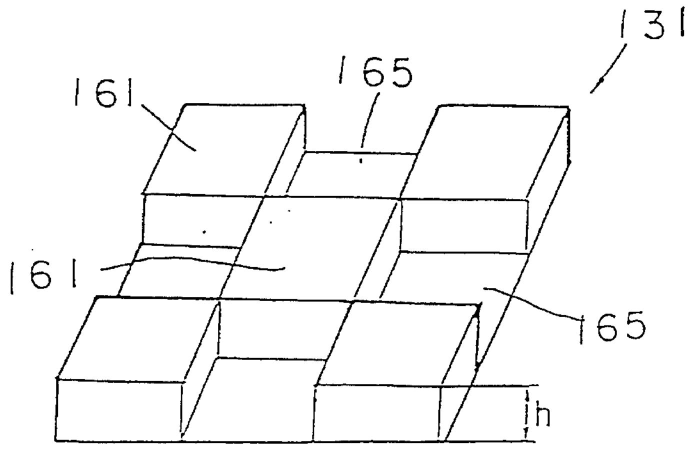
FIG. 26 is a fragmental perspective view showing one exemplary magnetic layer in the composite multilayer part of the invention.
Figure 27:
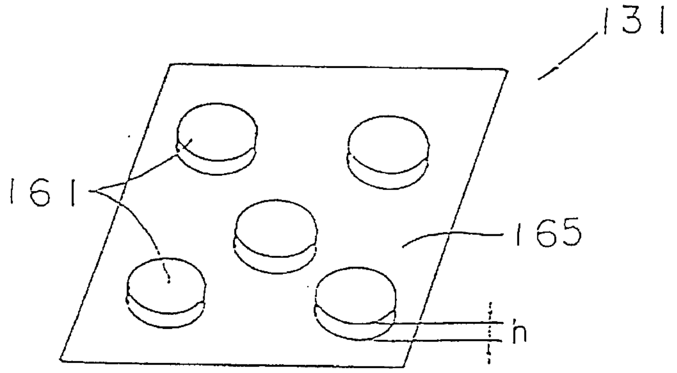
FIG. 27 is a fragmental perspective view showing one exemplary magnetic layer in the composite multilayer part of the invention.
Figure 28:
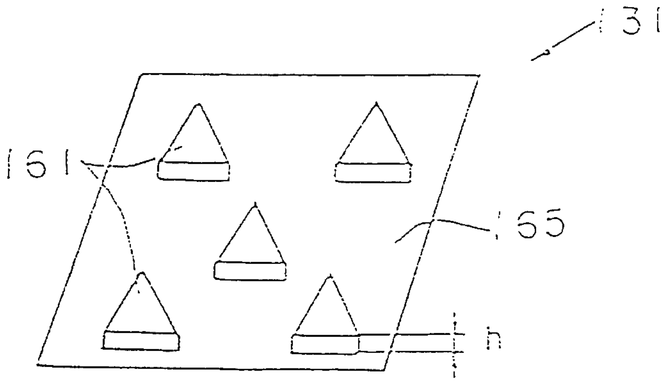
FIG. 28 is a fragmental perspective view showing one exemplary magnetic layer in the composite multilayer part of the invention.

Other exemplary shapes or patterns of asperities include a pattern of discrete recesses 165 distributed on a plane as shown in FIG. 25, a pattern of discrete protrusions 161 distributed on a plane as shown in FIGS. 27 and 28, and a pattern of recesses 165 and protrusions 161 distributed in edge contact as shown in FIG. 26. In these embodiments, the shape of recesses 165 and protrusions 161 may be ellipsoidal and polygonal as well as circular, triangular and rectangular like the illustrated ones.

Figure 29:
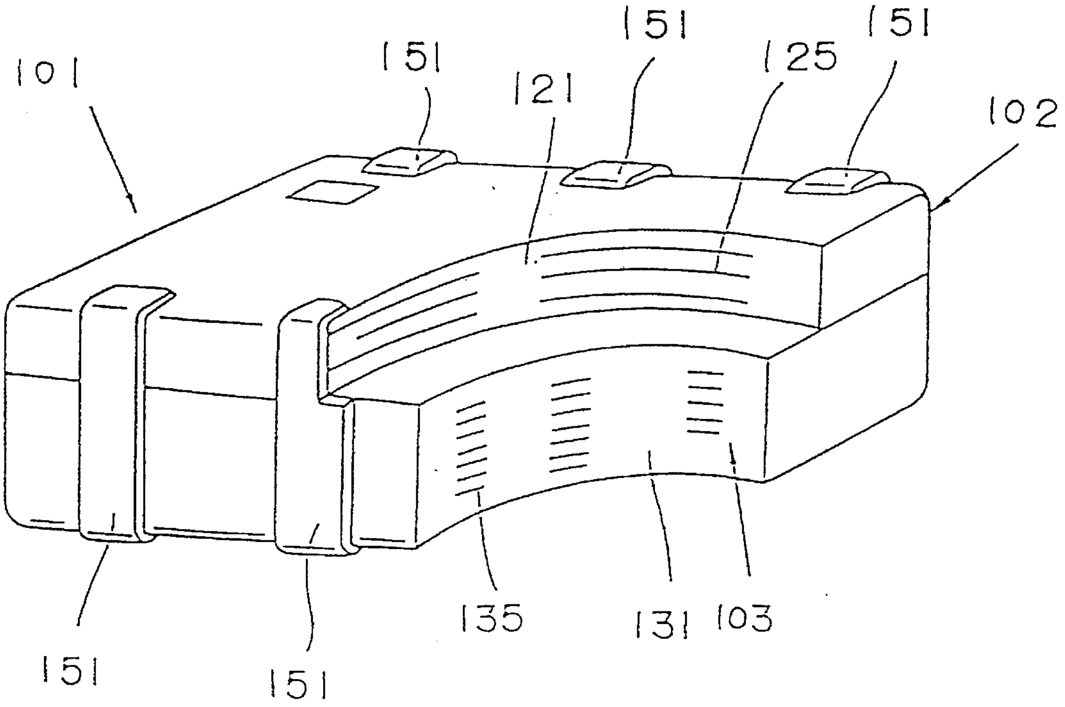
FIG. 29 is a perspective, partially cut-away, view of a multilayer LC composite part which is a preferred embodiment of the composite multilayer part of the invention.

It is to be noted that asperities are omitted in FIG. 29. Although the contour of asperities becomes somewhat obscured during firing due to interdiffusion taking place, the rugged interface is still discriminatable from the conventional smooth interface, for example, by observing how the dielectric layers and magnetic layers are fired under a scanning electron microscope (SEM).

The asperity patterns in the illustrated embodiments are regular with respect to shape, size and arrangement although the pattern may be irregular in some cases or a combination of different asperities. With respect to the size of asperities, the protrusions 161 preferably have a height h of 3 to 30 μm. Below or beyond this range, the ability to prevent precipitation of Cu, Zn or the like becomes insufficient. The height h of protrusions 161 is equivalent to the depth of recesses 165.

Where protrusions 161 are disposed in a stripe pattern, their width is about 0.5 to 2.5 mm. In a discrete distribution, their area is about 12 to 27 $mm^2$. The area ratio of protrusions 161 to recesses 165 is preferably from about 3/7 to 7/3, especially about 1/1. Preferably recesses 165 and protrusions 161 are uniformly distributed.

After the magnetic layer-forming paste is printed in such a rugged pattern, a paste and an internal electrode layer-forming paste are alternately printed to lay up layers, obtaining a green chip. At this point, the dielectric layer printed adjacent to the magnetic layer is formed on its magnetic layer-facing surface with asperities conformal to the rugged pattern of the magnetic layer, and the joint interface is thus formed with a desirable rugged configuration.

The green chip is then cut to a desired shape and stripped from the support. It will be understood that a green chip may also be prepared by forming green sheets from the magnetic layer-forming paste and the dielectric layer-forming paste, printing the inner conductor-forming paste and the internal electrode layer-forming paste thereon, and stacking the printed sheets. In this embodiment, the dielectric layer disposed adjacent to the magnetic layer can be directly printed.

Where the intermediate layer 104 is provided, the dielectric layer-forming paste may be printed after an intermediate layer-forming paste is printed on the magnetic layer-forming paste. Also in this case, the interface between the magnetic layer and the intermediate layer and the interface between the dielectric layer and the intermediate layer are formed with a rugged configuration by the same procedure as above. Then the external electrode-forming paste is printed or transferred to the green chip, and the magnetic layer-forming paste, inner conductor-forming paste, dielectric layer-forming paste, internal electrode layer-forming paste, external electrode-forming paste, and intermediate layer-forming paste, if any, are fired at the same time.

It is also possible to fire the chip before an external electrode-forming paste is printed and fired thereto.

The firing temperature is preferably 800° to 930° C., especially 850° to 900° C. The firing time is preferably 0.05 to 5 hours, especially 0.1 to 3 hours. Firing is generally carried out in air. For external electrode baking, the firing temperature is generally about 500° to 700° C., the firing time is generally about 10 to 30 minutes, and firing is generally carried out in air.

In the practice of the invention, heat treatment is preferably carried out in an atmosphere containing more excessive oxygen than the atmospheric air during and/or after firing. By the heat treatment in an excess oxygen atmosphere, metals such as Cu and Zn and substances which precipitate or have precipitated in the form of low resistance oxides such as $Cu_2O$ and $Zn_2O$ can be precipitated in the form of high resistance, non-detrimental oxides such as CuO and ZnO. Thus the part's circuit resistance is further improved.

The aforementioned heat treatment is preferably carried out during and/or after final firing. For example, where chip firing and firing for external electrode baking are carried out at the same time, the heat treatment is preferably carried out during and/or after this firing. Where chip firing is followed by firing for external electrode baking, the heat treatment is preferably carried out during and/or after the external electrode baking. If firing is carried out twice as in the latter case, heat treatment may be additionally carried out during or after chip firing as the case may be.

Preferably the heat treating atmosphere has an oxygen partial pressure ratio of 30 to 100 %, more preferably 50 to 100 %, most preferably 100 %. Below this range, the capability to suppress precipitation of Cu, Zn, $Cu_2O$, $Zn_2O$ or the like is low. Since the heat treatment in an excess oxygen atmosphere is generally carried out at the same time as firing or external electrode baking, the conditions of heat treatment including temperature and holding time are the same as the firing conditions or external electrode baking conditions. If the heat treatment is carried out independently, preferably the heat treating temperature is 550° to 900° C., especially 650° to 800° C. and the holding time is ½ to 2 hours, especially 1 to 1½ hours.

The composite multilayer parts of the present invention which are embodied as shielded multilayer chip inductors, shielded multilayer transformers and multilayer LC composite parts are mounted on printed circuit boards by providing soldering to the external electrodes and used in a variety of electronic equipment.

EXAMPLE

Examples of the invention are given below by way of illustration.

EXAMPLE 1

There were prepared magnetic ferrite M according to the blending composition shown below and non-magnetic ferrites A to H according to the blending composition shown in Table 1.

Magnetic ferrite M composition (mol %)

$Fe_2O_3$ (49.5)-NiO (16.5)-CUO (8.5)-ZnO (25.5)

TABLE 1

| Non-magnetic | Ferrite composition (mol %) | | | Additive oxides (wt %) | | | | | |
|---|---|---|---|---|---|---|---|---|---|
| ferrite | $Fe_2O_3$ | CuO | ZnO | BaO | MgO | $SiO_2$ | $SnO_2$ | $B_2O_3$ | CaO |
| A (comparison) | 47.5 | 5.5 | 47.0 | 0 | 0 | 0 | 0 | 0 | 0 |
| B (comparison) | 49.0 | 8.0 | 43.0 | 0 | 0 | 0 | 0 | 0 | 0 |
| C (comparison) | 49.0 | 8.0 | 43.0 | 0.27 | 0.23 | 0.20 | 0.01 | 0.08 | 0 |
| D (invention) | 49.0 | 12.0 | 39.0 | 0.94 | 0.79 | 0.71 | 0.05 | 0.30 | 0 |
| E (invention) | 49.0 | 12.0 | 39.0 | 2.76 | 2.41 | 2.20 | 0.19 | 0.91 | 0 |
| F (comparison) | 49.0 | 12.0 | 39.0 | 11.4 | 9.96 | 9.09 | 0.79 | 3.76 | 0 |
| G (invention) | 49.0 | 8.0 | 43.0 | 0.94 | 0.79 | 0.71 | 0.05 | 0.30 | 2 |
| H (invention) | 49.0 | 8.5 | 42.5 | 0.94 | 0.81 | 0.70 | 0 | 0.3 | 2 |

Using the above-defined magnetic ferrite M and each of non-magnetic ferrites A to H of Table 1, shielded multilayer chip inductors as shown in FIGS. 16–18 were fabricated by preparing pastes therefrom and following the steps of FIGS. 1–15. The coil-shape conductor was formed using a silver paste. The external electrodes were of printed silver film. Firing was carried out at a temperature of 870° C. under atmospheric pressure.

More particularly, layers were built up according to the method described in U.S. Pat. No. 4,322,698 and JP-A 51810/1981.

After firing, the base magnetic material layer was about 250 μm thick and the magnetic material layer between the conductor layers was about 25 μm thick.

The external electrodes were about 150 μm thick.

The thus fabricated inductors are designated inductors A to H in accordance with the non-magnetic materials used. These inductors A to H were examined for inductance L and Q and the presence of cracks. The results are shown in Table 2.

TABLE 2

| Inductor | Non-magnetic ferrite | L (μH) | Q | Cracks |
|---|---|---|---|---|
| A (comparison) | A | 21 | 62 | cracks |
| B (comparison) | B | 34 | 69 | none |
| C (comparison) | C | 34 | 70 | none |
| D (invention) | D | 46 | 75 | none |
| E (invention) | E | 53 | 77 | none |
| F (comparison) | F | 30 | 23 | none |
| G (invention) | G | 55 | 78 | none |

TABLE 2-continued

| Inductor | Non-magnetic ferrite | L (μH) | Q | Cracks |
|---|---|---|---|---|
| H (invention) | H | 54 | 77 | none |

As is evident from Table 2, the inductors using non-magnetic ferrites D, E, G and H within the scope of the invention provide high inductance L and Q as compared with comparative non-magnetic ferrites A, B and F and are free of cracks.

Figure 20:
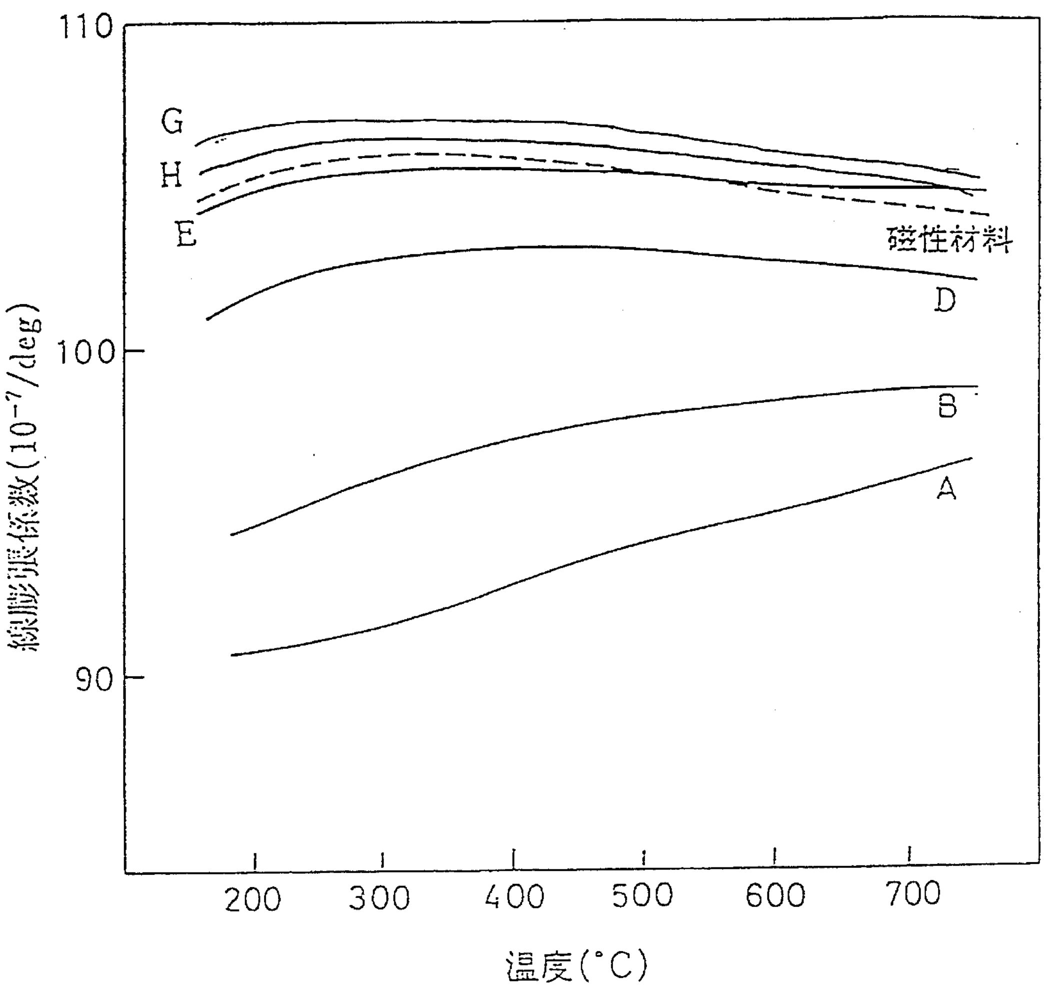
FIG. 20 is a graph showing the coefficients of linear expansion of magnetic and non-magnetic ferrites relative to temperature.

This is ascertained from FIG. 20 showing a coefficient of linear expansion relative to temperature. More particularly, comparative non-magnetic ferrites A and B have a coefficient of linear expansion noticeably different from that of the magnetic ferrite over a temperature range whereas inventive non-magnetic ferrites D, E, G and H have a coefficient of linear expansion very close to that of the magnetic ferrite (designated magnetic material in the graph) over a temperature range. By virtue of this, the inventive inductors can prevent a lowering of IR which is otherwise caused by precipitation of CuO, ZnO or the like.

Cross sections of inventive inductors D, E, G and H were observed under SEM to find that in the space between adjoining magnetic material layers, the conductor faced each magnetic material layer through a crevice. The percent contact area of the conductor layer in contact with the magnetic material layer in the space was approximately 0% in all samples. The ratio of the cross-sectional area that the conductor layer occupies in the space was about 60% in all samples. The conductor layer had a void content of about 5% in all samples.

The inventive inductors had good temperature characteristics of L and Q.

The open magnetic circuit type inductors of the invention are thus compact open magnetic circuit type inductors which eliminate a need for a metal casing, allow the inductor constant to be controlled by a choice of the magnetic permeability of the inner magnetic material, and substantially prevent leakage of magnetic flux to the exterior. By defining a crevice between the magnetic material layer and the conductor layer in the space between the magnetic material layers, the influence on the magnetic material layers by expansion and contraction of the conductor layer can be minimized, resulting in increased inductance L and Q. In addition, the temperature characteristics of L and Q are satisfactory.

Although ferrite containing $Fe_2O_3$, CuO and ZnO was used as the most desirable ferrite in the above-mentioned example, equivalent results are obtained from ferrite consisting of $Fe_2O_3$ and CuO or $Fe_2O_3$ and ZnO. Also equivalent results are obtained from a powder mixture consisting of MgO, BaO, $SiO_2$ and $B_2O_3$ as additive oxides.

EXAMPLE 2

Inductors were fabricated by the same procedure as inductors D, E, G and H in Example 1 except that an intermediate insulator layer of 50 μm thick was formed at the joint interface between magnetic ferrite and non-magnetic ferrite. They are designated inductors D', E', G' and H' which correspond to inductors D, E, G and H.

The intermediate insulator layer of inductors D', E', G' and H' was made of a 5:5 (weight ratio) mixture of magnetic ferrite M and the non-magnetic ferrite used in the corresponding one of inductors D, E, G and H.

Inductors D', E', G' and H' were examined as in Example 1 to find satisfactory results at least comparable to those of inductors D, E, G and H.

EXAMPLE 3

Multilayer transformers as shown in FIG. 19 were fabricated by using non-magnetic ferrite E of Example 1 and magnetic ferrites M1 to M16 shown in Table 3and following the inductor fabrication procedure of Example 1. The intermediate insulator layer was omitted. The products are designated transformers 1 to 16 in accordance with magnetic ferrites M1 to M16.

The conductor layer material, external electrode, and firing conditions are the same as in Example 1. After firing, the base magnetic material layer was about 300 μm thick and the magnetic material layer between the conductor layers was about 25 μm thick.

Transformers 1 to 16 were determined for power loss (Pcv) and efficacy under conditions: 500 kHz and 20 mT. The results are shown in Table 3.

TABLE 3

| Transformer | Magnetic ferrite | Ferrite composition (mol %) | | | | Properties (500 kHz, 20 mT) | |
|---|---|---|---|---|---|---|---|
| | | $Fe_2O_3$ | NiO | CuO | ZnO | Pcv (kw/m$^3$) | Efficacy |
| 1 | M 1 | 49.0 | 3.0 | 11.0 | 37.0 | non-magnetic at room temperature | |
| 2 | M 2 (preferred) | 49.0 | 10.0 | 11.0 | 30.0 | 50.9 | 65 |
| 3 | M 3 | 49.0 | 17.0 | 11.0 | 23.0 | 89.2 | 54 |
| 4 | M 4 | 49.0 | 19.0 | 4.0 | 28.0 | 80.4 | 58 |
| 5 | M 5 (preferred) | 49.0 | 12.0 | 11.0 | 28.0 | 48.8 | 66 |
| 6 | M 6 | 49.0 | 3.0 | 20.0 | 28.0 | 98.3 | 59 |
| 7 | M 7 | 49.0 | 10.0 | 22.0 | 19.0 | 123.7 | 56 |
| 8 | M 8 (preferred) | 49.0 | 10.0 | 14.0 | 27.0 | 47.6 | 66 |
| 9 | M 9 | 49.0 | 10.0 | 5.0 | 36.0 | non-magnetic at room temperature | |
| 10 | M 10 | 43.0 | 7.0 | 16.0 | 34.0 | short sintering | |
| 11 | M 11 | 52.0 | 10.0 | 10.0 | 28.0 | short sintering | |
| 12 | M 12 | 49.0 | 3.0 | 14.0 | 34.0 | 151.2 | 53 |
| 13 | M 13 | 49.0 | 12.0 | 5.0 | 34.0 | non-magnetic at room temperature | |
| 14 | M 14 | 49.0 | 8.0 | 20.0 | 23.0 | 124.1 | 52 |
| 15 | M 15 | 49.0 | 14.5 | 17.5 | 19.0 | 168.6 | 50 |
| 16 | M 16 | 49.0 | 7.0 | 8.0 | 36.0 | non-magnetic at room temperature | |

It is evident from Table 3that transformers 2, 5 and 6 using magnetic ferrites M2, M5 and M8 which are preferred in the invention provides improvements in such properties as power loss and efficacy.

Among transformers 1to 16, transformers 2–8, 12, 14 and 15 could be evaluated for properties. Magnetic ferrites M1 to M16 and non-magnetic ferrite E used in these transformers were determined for a coefficient of linear expansion as in Example 1. All these ferrites had values equivalent or close to those of the inventive samples in Example 1.

SEM observation revealed that the conductor faced the magnetic material layer through a crevice. The percent contact area between the conductor layer and the magnetic material layer, the ratio of the cross-sectional area that the conductor layer occupies in the space, and the void content of the conductor layer were approximately equal to those of inductors D and E of Example 1. Temperature characteristics were satisfactory.

EXAMPLE 4

Transformers were fabricated by the same procedure as transformers 2, 5 and 8 in Example 3 except that an intermediate insulator layer of 50 μm thick was formed at the joint interface between magnetic ferrite and non-magnetic ferrite. They are designated transformers 2', 5' and 8' which correspond to transformers 2, 5 and 8.

The intermediate insulator layer was made of a 5:5 (weight ratio) mixture of magnetic material and non-magnetic material as in Example 2.

Transformers 2', 5' and 8' were examined as in Example 3 to find satisfactory results at least comparable to those of transformers 2, 5 and 8.

EXAMPLE 5

Multilayer LC composite parts were fabricated by preparing the following pastes.

Magnetic Layer-forming Paste

Powders of NiO (17 mol %), CuO (9 mol %), ZnO (25 mol %) and $Fe_2O_3$ (49 mol %) having a particle size of about 0.1 to 3.0 μm were wet milled in a ball mill. The wet mixture was then dried by a spray dryer, calcined at 750 ° C. into granules, which were ground again in a ball mill and dried by a spray dryer, yielding a Ni—Cu—Zn ferrite raw powder having a mean particle size of 0.1 μm.

To 100 parts by weight of the raw powder were added 3.84 parts by weight of ethyl cellulose and 78 parts by weight of terpineol. The mixture was milled in a three-roll mill to form a paste.

Inner Conductor-Forming Paste

To 100 parts by weight of silver having a mean particle size of 0.8 μm were added 2.5 parts by weight of ethyl cellulose and 40 parts by weight of terpineol. The mixture was milled in a three-roll mill to form a paste.

Dielectric Layer-forming Paste

Powders of $TiO_2$ (92 mol %) with a mean particle size of 0.7 μm, CuO (4 mol %) with a mean particle size of 0.05 μm, and NiO (4 mol %) with a mean particle size of 0.5 μm were used. To 100 parts by weight of the dielectric powder were added 3.5 parts by weight of ethyl cellulose and 40 parts by weight of terpineol. The mixture was milled in a three-roll mill to form a paste.

Internal Electrode Layer-forming Paste

To 100 parts by weight of silver having a mean particle size of 0.8 μm were added 2.5 parts by weight of ethyl cellulose and 40 parts by weight of terpineol. The mixture was milled in a three-roll mill to form a paste.

Intermediate Layer-forming Paste

A raw material was prepared from a mixture of powders of ZnO (46.0 mol %), CuO (5.0 mol %) and $Fe_2O_3$ (49.0 mol %) having a particle size of about 0.8 μm by adding thereto BaO (0.94% by weight), MgO (0.79% by weight), SiO (0.71% by weight), $SnO_2$ (0.05% by weight) and $B_2O_3$ (0.30% by weight). This raw material was processed into a non-magnetic Zn—Cu ferrite raw powder having a mean particle size of 0.2 μm as was the magnetic layer-forming paste. To 100 parts by weight of the raw powder were added 3.5 parts by weight of ethyl cellulose and 40 parts by weight of terpineol. The mixture was milled in a three-roll mill to form a paste.

External Electrode Layer-forming Paste

To 100 parts by weight of silver having a mean particle size of 1.2 μm were added 3.0 parts by weight of ethyl cellulose, 7 parts by weight of glass frit, and 40 parts by weight of terpineol. The mixture was milled in a three-roll mill to form a paste.

The thus prepared magnetic layer-forming paste and inner conductor-forming paste were printed in layers, the intermediate layer-forming paste was then printed, and the dielectric layer-forming paste and internal electrode layer-forming paste were printed in layers, yielding a green chip.

The intermediate layer applied herein was 50 μm thick.

The chip was then fired at 890° C. for two hours in air.

After firing, the external electrode layer-forming paste was printed and then fired at 600° C. for 30 minutes in air for baking external electrodes.

In this way, a LC filter composite part sample of 5.0 mm×5.0 mm×2.7 mm was fabricated.

The magnetic layer was 40 μm thick, and the inner winding (inner conductor) had a thickness of 15 μm and a width of 300 μm. The winding number was 25 turns.

The dielectric layer was 100 μm thick, the number of dielectric layers was 5 layers, and the internal electrode layer was 15 μm thick. The external electrode was 800 μm thick.

For comparison purposes, samples were fabricated by the same procedure as above except that an intermediate layer was omitted in one sample and only a powder mixture of ZnO (47.0 mol %), CuO (5.5 mol %) and $Fe_2O_3$ (47.5 mol %) was used as the raw powder for the intermediate layer-forming paste in another sample.

The samples were measured for circuit resistance IR. The results are shown in Table 4.

TABLE 4

| Intermediate layer material | IR (Ω) |
|---|---|
| Intermediate layer omitted | $7.8 \times 10^7$ |
| Comparative intermediate layer | $8.1 \times 10^8$ |
| Inventive intermediate layer | $9.0 \times 10^9$ |

The advantages of the invention are evident from the results of Table 4.

In addition to the LC filter composite parts, other composite multilayer parts such as LC traps were fabricated, with equivalent results.

Although ferrite containing $Fe_2O_3$, CuO and ZnO was used as the most desirable ferrite in the above-mentioned example, equivalent results are obtained from ferrite consisting of $Fe_2O_3$ and CuO or $Fe_2O_3$ and ZnO. Also, although a powder mixture of MgO, BaO, $SiO_2$, $B_2O_3$ and $SnO_2$was used as additives, a mixture of MgO, BaO, $SiO_2$ and $B_2O_3$, a mixture of MgO, BaO, $SiO_2$, $B_2O_3$ and CaO or a mixture of MgO, BaO, $SiO_2$, $B_2O_3$, $SnO_2$ and CaO may be equally used.

ADVANTAGES

The non-magnetic ferrite defined in the invention has a coefficient of linear expansion close to that of magnetic ferrite used and is thus effective for preventing deterioration of characteristics. When used in composite multilayer parts such as shielded multilayer chip inductors, shielded multilayer transformers, and multilayer LC composite parts, the non-magnetic ferrite is effective for preventing occurrence of cracks in the interior. This avoids a lowering of IR due to local precipitation of CuO, ZnO or the like at the joint interface caused by an extreme change in composition between different materials. There result composite multilayer parts with improved characteristics.

We claim:

1. A sintered composite multilayer part comprising a magnetic material layer containing magnetic ferrite, a non-magnetic insulator layer, and a conductor layer, said part having an inductor built therein, said non-magnetic insulating layer being formed from a non-magnetic ferrite composition comprising a non-magnetic ferrite base component and an added oxide component, said non-magnetic ferrite base component consisting of an oxide composition selected from the group consisting of (a) an oxide composition consisting of iron oxide, copper oxide and zinc oxide, (b) an oxide composition consisting of iron oxide and copper oxide, and (c) an oxide composition consisting of iron oxide and zinc oxide, said oxides in each of said oxide compositions (a), (b) and (c) comprising 100 mol % of said oxide composition, said added oxide component being selected from the group consisting of (i) a four oxide component consisting of magnesium oxide, barium oxide, silicon oxide and boron oxide, (ii) a five oxide component consisting of the aforesaid four oxide component plus a fifth oxide selected from the group consisting of tin oxide and calcium oxide, and (iii) a six oxide component consisting of the aforesaid four oxide component plus tin oxide and calcium oxide, with the proviso that the added oxide component comprises 0.25 to 8% by weight of MgO, 0.4 to 9% by weight of BaO, 0.25 to 7% by weight of $SiO_2$, 0.1 to 3% by weight of $B_2O_3$, 0 to 0.7% by weight of $SnO_2$, and 0 to 8% by weight of CaO, the total amount added being 1 to 30% by weight based on the non-magnetic ferrite base component.

2. The composite multilayer part of claim 1 wherein said non-magnetic ferrite base component consists of 46 to 50 mol % of $Fe_2O_3$, 2 to 20 mol % of CuO, and 33 to 52 mol % of ZnO.

3. The composite multilayer part of claim 1 wherein said magnetic material layer is comprised of a magnetic ferrite containing two or three oxides selected from the group consisting of NiO, CuO and ZnO.

4. The composite multilayer part of claim 1 wherein said non-magnetic ferrite has a base component consisting of 46 to 50mol % of $Fe_2O_3$, 2 to 20 mol % of CuO, and 33 to 52 mol % of ZnO, and said non-magnetic ferrite composition has the oxide components: 0.25 to 4% by weight of MgO, 0.4 to 4.5% by weight of BaO, 0.25 to 3.5% by weight of $SiO_2$, 0.1 to 3% by weight of $B_2O_3$, 0 to 0.7% by weight of $SnO_2$, and 0 to 4% by weight of CaO, added to said ferrite base component in a total amount of 1 to 15% by weight.

5. The composite multilayer part of claim 1 wherein said magnetic material layer contains a ferrite selected from the group consisting of Ni—Zn ferrite and Ni—Cu—Zn ferrite.

6. The composite multilayer part of claim 5 wherein said magnetic ferrite is Ni—Zn ferrite and contains 10 to 25 mol % of NiO and 15 to 40 mol % of ZnO.

7. The composite multilayer part of claim 5 wherein said Ni—Cu—Zn ferrite contains 5 to 25 mol % of NiO, 5 to 15 mol % of CuO, and 20 to 30 mol % of ZnO.

8. The composite multilayer part of claim 1 which is heat treated in an atmosphere containing more oxygen than atmospheric air during or after firing.

9. The composite multilayer part of claim 8 wherein said atmosphere has an oxygen partial pressure ratio of 30 to 100 %.

10. The composite multilayer part of claim 1 wherein said magnetic material layer is in contact with said non-magnetic insulator layer.

11. The composite multilayer part of claim 10 wherein said non-magnetic ferrite base component consists of 46 to 50 mol % of $Fe_2O_3$, 2 to 20 mol % of CuO, and 33 to 52 mol % of ZnO, and said non-magnetic ferrite composition has added thereto an added component consisting of: 0.5 to 8% by weight of MgO, 0.8 to 9% by weight of BaO, 0.5 to 7% by weight of $SiO_2$, 0.2 to 3% by weight of $B_2O_3$, 0 to 0.7% by weight of $SnO_2$, and 0 to 8% by weight of CaO, added to said ferrite in a total amount of 2 to 30% by weight.

12. The composite multilayer part of claim 10 wherein said magnetic ferrite contains 40 to 52 mol % of $Fe_2O_3$, 0 to 50 mol % of NiO, 0 to 20 mol % of CuO, and 0 to 50 mol % of ZnO.

13. The composite multilayer part of claim 12 wherein said magnetic ferrite is a ferrite consisting of 46 to 49.5 mol % of $Fe_2O_3$, 5 to 15 mol % of NiO, 6 to 18 mol % of CuO, and 20 to 35 mol % of ZnO.

14. A composite multilayer part as set forth in claim 10 wherein said magnetic material comprises an inner magnetic material and an outer magnetic material which surrounds said non-magnetic insulator, said part being comprised of a plurality of superimposed layers wherein, 1) said inner magnetic material is a layered section including a plurality of superimposed layers of magnetic material, 2) said non-magnetic insulator is a layered section including a plurality of superimposed layers of non-magnetic insulating material, said insulating material layers surrounding said inner magnetic layered section, and 3) said outer magnetic material is a layered section including a plurality of superimposed layers of magnetic material said outer magnetic material surrounding the periphery of said non-magnetic insulating layered section, said non-magnetic insulator layered section having a layered conductor included therein, such that the conductor exists in the form of vertically stacked, overlying turns of conductor material lying between successive layers of superimposed insulator layers, said turns of conductor material surrounding said inner magnetic layered section.

15. The composite multilayer part of claim 14 wherein said layered conductor has a void content of up to 50%.

16. The composite multilayer part of claim 14, which further includes an intermediate insulator layer formed at the joint interface between said magnetic material layer and said non-magnetic insulator layer, said intermediate insulator layer having a coefficient of linear expansion intermediate to the coefficients of linear expansion of the magnetic ferrite and the non-magnetic ferrite.

17. The composite multilayer part of claim 16 wherein said intermediate insulator layer contains the magnetic ferrite and the non-magnetic ferrite in a weight ratio of from 1:9 to 9:1.

* * * * *